United States Patent [19]
Buckman

[11] 3,903,922
[45] Sept. 9, 1975

[54] UNITARY CHECK VALVE AND RETAINER THEREFOR

[76] Inventor: Thomas P. Buckman, 11561 Shelly Vista Dr., Tujunga, Calif. 91042

[22] Filed: Apr. 3, 1974

[21] Appl. No.: 457,486

[52] U.S. Cl. .............................. 137/525; 137/525
[51] Int. Cl.² .................................. F16K 15/14
[58] Field of Search .................................. 137/525

[56] References Cited
UNITED STATES PATENTS

| | | | |
|---|---|---|---|
| 2,910,093 | 10/1959 | Dahl | 137/525 X |
| 2,912,999 | 11/1959 | Kersh | 137/525 X |
| 2,913,000 | 11/1959 | Roberts | 137/525 |
| 3,610,263 | 10/1971 | Walters | 137/525 X |

Primary Examiner—William R. Cline
Attorney, Agent, or Firm—Witherspoon and Lane

[57] ABSTRACT

A unitary check valve and retainer having primary usage in hydraulic or pneumatic systems operating at low differential pressure of fractions of ounces to several pounds per square inch. This check valve and retainer unit comprises a cone shaped valve member having a diameter at its enlarged end slightly greater than the diameter of the tube into which it is inserted. The valve member is interconnected to a retainer member which is cylindrical and incorporates a plurality of barb-shaped elements that make assembly easy, but removal difficult. The retainer member incorporates holes or grooves for the passage of fluid.

3 Claims, 4 Drawing Figures

UNITARY CHECK VALVE AND RETAINER THEREFOR

SUMMARY OF THE INVENTION

This invention relates to check valves and, more particularly, to unitary resilient check valves operational in the low pressure range.

Although there are many unitary check valves operating in the low pressure range in commercial use today, there are very few which operate in such pressure range with reasonable reliability.

In view of the foregoing, it is an object of this invention to provide a unitary check valve capable of reliable operation in the low pressure range.

It is another object of this invention to provide a unitary check valve having wide dimensional tolerance and thus capable of being manufactured at very low cost.

It is yet another object of this invention to provide a check valve having a resilient valve element with good sealing characteristics including virtually zero leakage in the closed position and can be used in any position from upright to inverted.

The above and additional objects and advantages will become more apparent when taken in conjunction with the following detailed description and drawing.

IN THE DRAWING

DETAILED DESCRIPTION OF THE INVENTION

Figure 1:
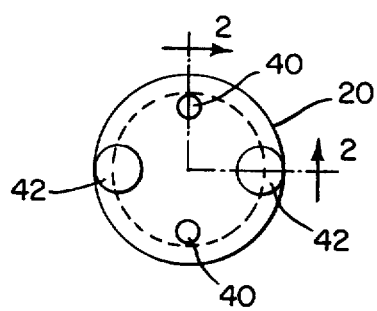
FIG. 1 is a top plan view of the unitary check valve.
Figure 2:
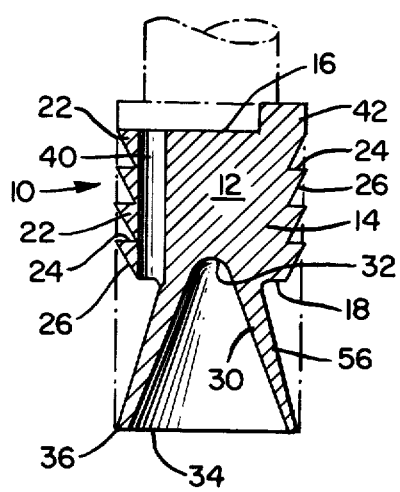
FIG. 2 is a cross sectional view taken along line 2—2 of FIG. 1.

As best illustrated in FIGS. 1 and 2, the check valve 10 comprises a retainer portion 12 including a cylindrical body 14 having a top 16, a bottom 18 and a connecting vertical side wall 20. Retaining means in the form of outwardly extending barbs 22 are formed in the vertical side wall 20. Each barb 22 has two faces which intersect to form a point, specifically each barb has a radially and outwardly extending face 24 and a sloping face 26 which slopes at an angle of approximately 30° with respect to face 24 and towards the top 16 of the body 12. These barbs 22 may be distributed over the entire vertical side wall 20 or in spaced areas as needs dictate.

A cone shaped valve 30 extends downwardly from the retainer body bottom 18 with the apex 32 of the valve being secured to said bottom 18. The valve 30 is sized such that the open end 34 has a diameter substantially that of the retainer body 14 so that the lip 36 at the end of the cone shaped valve 30 will snugly engage the inner wall of the tube in which it is placed.

Passage means in the form of vertical holes 40 are provided in the retainer body 14 for flow purposes. In addition, the top 16 of the retainer body 14 has one or more upstanding protrubances 42 which act as spacers so that if the valve 10 is positioned in a tube having apparatus therein a sufficient spacing will be provided to assure full and even flow when the valve is open.

Figure 4:
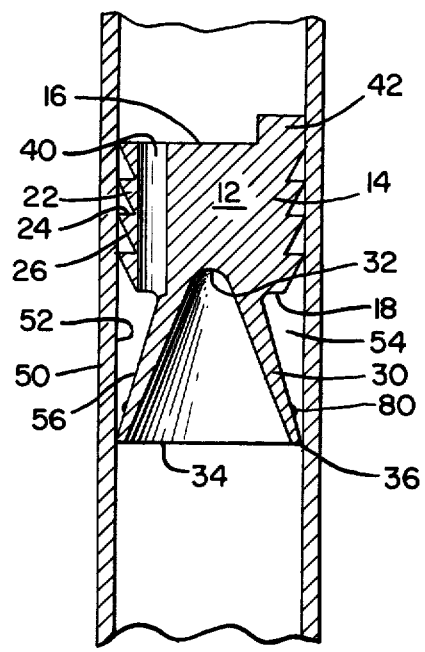
FIG. 4 is a sectional view illustrating the manner in which the check valve operationally fits within a tube.

FIG. 4 shows the check valve 10 as it appears when functionally positioned in a tube 50. The check valve is quite easy to install in a tube when it is introduced into the tube in the direction of flow because in this position the barbs 22 are readily deformed as they come into engagement with the inner surface 52 of the tube 50. On the other hand, pressure on the valve from the bottom side will tend to cause the barbs 22 to further expand outwardly and thus produce firmer contact with the inner surface 52 of the tube 50.

In operation, liquid flows through the tube 50 in the direction indicated by the arrows wherein the liquid under sufficient pressure passes downward through holes 40 into the annular space 54 defined by the inner wall 52 of the tube 50, the bottom 18 of the retainer body 14 and the outer surface 56 of cone shaped valve 30. The lip 36 of the valve 30 is forced away from the inner wall 52 of the tube 50 so that the liquid may flow therepast.

Figure 3:
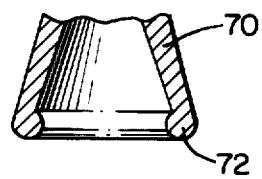
FIG. 3 is a partial view in section of a valve variation.

Another embodiment of the cone shaped valve element is shown in FIG. 3 wherein the cone shaped valve 70 has a lip portion 72 which is enlarged thereby providing greater back pressure in the free flow direction whereby the valve may act as a relief valve as well as a check valve.

The unitary check valve of this invention is made of any suitable resilient and reasonably tough material preferably one that may be easily molded. In this connection, it should be noted (FIG. 3) that the flashing 80 on the outer surface 56 of the cone shaped valve 30 is positioned away from the lip 36. This means that the possibility of leakage occasioned by the flashing that could occur at the lip 36 of the cone shaped valve 30 has been eliminated.

I claim:

1. A unitary check valve of resilient material adapted for positioning within a tubular member for controlling flow therethrough, said check valve comprising a retainer portion having a cylindrical body including a top and bottom connected by a vertical side wall, said cylindrical body having a length at least as great as its diameter, a plurality of circular rows of barbs on the vertical side wall from the top to the bottom thereof for engaging and gripping the inner wall of the tubular member adapted to receive the check valve, a cone-shaped valve integral with and extending from the bottom of the cylindrical body of the retainer, said cone-shaped valve having its apex adjacent the bottom of the cylindrical body whereby the cone flares downwardly and outwardly, the edge of the open end of the cone-shaped valve being sized to snugly engage the inner wall of the tubular member in which the valve is positioned, and passage means in the cylindrical body of the retainer to allow liquid to flow by the body from the top to the bottom and pass into the annular space defined by the inner wall of the tubular member and the outer surface of the cone-shaped valve whereby when the pressure in this space is sufficient to deflect the valve and pull the edge of the valve away from the inner wall of the tubular member liquid will flow therepast.

2. The invention as set forth in claim 1 and wherein the passage means in the cylindrical body comprises at least one hole or groove extending completely through the body.

3. The invention as set forth in claim 2 and wherein the top of the cylindrical body of the retainer is provided with at least one spacer member adapted to provide clearance for the retainer top to make certain that there will always be unrestricted and even flow through the body of the retainer.

* * * * *